United States Patent [19]
Fox et al.

[11] Patent Number: 6,064,792
[45] Date of Patent: May 16, 2000

[54] SIGNAL RECORDER WITH DEFERRED RECORDING

[76] Inventors: James Kelly Fox, P.O. Box 800448 26035 Manzano Ct., Valencia, Calif. 91380-0448; Harold Charles Schloss, 1757 Preuss Rd., Los Angeles, Calif. 90035; Clinton Gregory White, 17791 42nd Rd. North, Loxahatchee, Fla. 33470

[21] Appl. No.: 08/910,510

[22] Filed: Aug. 2, 1997

[51] Int. Cl.[7] .............................. H04N 5/91; H04N 7/00
[52] U.S. Cl. ................................... 386/46; 360/7
[58] Field of Search .................... 386/1, 45, 46, 386/83, 125, 126; 360/5, 7, 10.1; H04N 5/76, 5/96

[56] References Cited

U.S. PATENT DOCUMENTS

| | | | |
|---|---|---|---|
| 5,345,430 | 9/1994 | Moe ............................................ | 360/7 |
| 5,477,487 | 12/1995 | Greenberg . | |
| 5,479,302 | 12/1995 | Haines ...................................... | 360/69 |
| 5,526,125 | 6/1996 | Mori et al. .............................. | 360/10.1 |
| 5,555,463 | 9/1996 | Staron . | |

FOREIGN PATENT DOCUMENTS 89-297-473  6/1988  European Pat. Off. .

OTHER PUBLICATIONS

Portable Cockpit Recorder "Air Repeater II" 2 page marketing literature , FlightCom, Portland Oregon Marketed 1996.

Digital Voice Recorder "DVR 300i" 2 page marketing literature, FlightCom, Portland, Oregon Marketed 1996.

Digital note recorder Notecorder 300 copy of product package & instructions attached Olympus America Inc, Melville, NY Marketed 1996.

Implantable heart monitor "Reveal" press release attached Medtronic, Minneapolis, MN, Feb. 14, 1997 Press Release.

Automobile Radio with Digital Recording "Panasonic CQ–DP745" Matsushita Consumer Electronics Co, Secaucus, NJ, 1996 Catalog.

*Primary Examiner*—Thai Than
*Assistant Examiner*—Christopher Onuaku
*Attorney, Agent, or Firm*—Harold C. Schloss

[57] ABSTRACT

A device for recording and playing back a selected episode from an input analog audio-visual signal. A "deferred recording" feature allows the user to briefly delay his/her decision to record a live signal episode until after the signal episode has at least partially transpired. Thus, the user can first evaluate the episode prior to deciding whether to record it. The recorded signal episode contains both preamble and postamble segments, i.e. the signal segments preceding and following activation of a record switch. The analog playback signal is directed to an A/V output device so it can be heard/viewed by the user. Some embodiments provide for recording multiple signal episodes, multi-signal channel episodes, variable length episodes, simultaneous record and playback, episode deletion, variation of sampling rate, skip forward, reverse, and squelch.

20 Claims, 4 Drawing Sheets

SIGNAL RECORDER WITH DEFERRED RECORDING

BACKGROUND

1. Field of the Invention

The invention relates to audio-visual ("A/V") devices, specifically to "deferred recording" devices for repeating A/V episodes from an A/V device. A/V devices, such as radios or television receivers, are often used in environments where momentary distractions or signal distortions can cause the user to miss a received signal episode.

2. Problem Description

While using a radio receiver in a noisy local environment, a user may miss, i.e. not completely comprehend, an important broadcast A/V signal episode. This often occurs with the use of automobile radios where the driver may be distracted during important broadcast moments like traffic reports, telephone numbers or sports scores. Similarly, a user may miss a received signal that has been degraded by transmission path effects or by electromagnetic interference. In the case of two-way radios used in conjunction with public transportation, a missed radio signal can affect the safety of the vehicle and passengers. Examples include the use of radios by aircraft, ship, and train crews. To illustrate, an aircraft pilot may miss an important air traffic voice communication due to either a distorted signal or a local distraction. One or more playbacks of a slightly distorted received signal would often enable a user to fully understand the missed episode. It would be useful for the user to be able to ask "What?" of the device and if the device is manually actuated within a reasonable length of time, i.e. within a few seconds of the beginning of the missed A/V episode, to repeat exactly what had been received in the moments before and after activation of a record switch. In the use of telephones, it is often useful to record and store telephone numbers as they are recited into the telephone. In the use of digital note-recorders and cassette recorders in classroom or conference situations, it is often useful to restrict recording to only selected A/V episodes. Additionally, it is useful to briefly defer the recording of an episode until after the A/V episode has transpired and has been heard/viewed and evaluated by the user. Regarding the content of the recorded episode, it is often important that the A/V segment following the actuation of a record switch also be recorded. That following segment, known as a "postamble", often adds useful context to the preceding "preamble" segment. In many cases that recorded preamble segment alone would be inadequate to facilitate full comprehension by the user.

3. Prior Art

Some common A/V devices can record a live received signal episode for later playback. Originally, such devices could record only the signal segment received after a record switch was pressed and the signals received prior to a user pressing a record switch were lost. Consequently, the user first had to anticipate that he/she would need to record a future signal episode. This was usually not practical since the user must first hear/view and evaluate the received signal prior to being able to decide whether to record it. A "deferred record" capability was needed which would allow the user to defer pressing the record switch until after the user had first viewed/heard the earlier segment of the live A/V signal.

Digital Note Recorder

A digital note recorder, "Note Corder 300", records multiple audio episodes of variable length in semiconductor memory, RAM, for subsequent playback. When the user presses a record switch, the Note Corder begins recording the audible audio signal received after the switch is pressed. Recording stops when the user presses the record switch a second time.

(Olympus America Inc., Melville, N.Y.)

Traffic Advisory Automobile Radio

European patent application EPA 89-01 297-473 by Haas discloses an automobile radio receiver that automatically records a broadcast traffic-advisory audio signal in a semiconductor memory for subsequent playback by the user. The audio signal is transmitted on a subcarrier concurrently with the main audio signal. With this receiver, the user need not anticipate the need to record the audio signal episode of interest.

Automobile Radio with Digital Recorder

An automobile radio, "Panasonic CQ-DP745", digitally records a single brief audio episode of variable length in semiconductor memory for subsequent playback.

(Matsushita Consumer Electronics Co, Secaucus, N.J.)

Audio Auto-Repeat Device

U.S. Pat. No. 5,477,487 to Greenberg discloses an "Audio Auto-Repeating Device" with a "deferred record" capability. This device records a brief audio segment, of fixed length, received immediately prior to the actuation of a record switch.

Television Receiver

U.S. Pat. No. 5,555,463 to Staron discloses a "Television Receiver with Deferred Transmission of Moving Image Sequences" that outputs delayed video and audio signals. This allows the user to view and hear a just received A/V signal episode a second time.

Medical Devices

An implantable heart monitor device, "Reveal", records an episode of cardiac signals into the monitor's memory for later use by a physician. When symptoms appear, the patient applies an external record signal via a handheld "activator" to initiate recording.

(Medtronic, Inc. Minneapolis, Minn., U.S.A.)

SUMMARY OF PRIOR ART

What is needed is an A/V device that allows the radio operator/user to ask "What?" of a radio receiver, television receiver, or other A/V device. Provided the operator actuates a control switch within a reasonable time period, i.e. within a few seconds of the missed signal episode, the device should exactly repeat, i.e. playback, the missed A/V episode. That repeated signal episode should contain two segments of the received signal material: the just transpired A/V segment, i.e. a "preamble", and a brief segment of the following contextual signal material, i.e. a "postamble". Such an A/V episode recording and repeating device should, in effect, provide a "deferred commitment to record" capability. A user would first be able to briefly evaluate a live A/V segment and then could either do nothing and ignore the just received episode, or the user could actuate a control switch and record the A/V episode.

Such a device can be an integral part of another A/V device such as: radio receiver, television receiver, telephone, cassette recorder, digital note recorder, or receiver for underwater sonar signals.

In summary, all of the A/V signal recorders described above fall short by recording only a fragment of the received signal episode of interest. None of the devices record a complete signal episode comprising both a preamble and postamble. Additionally, none of the above devices provides the following useful features:

1. squelch, i.e. suppression of recording during intervals of quiescent signal
2. user controlled or adaptive sampling rate
3. multiple signal (channels) of input & output
4. simultaneous playback of a first episode while recording a second signal episode.

OBJECTS AND ADVANTAGES

Accordingly, several objects and advantages of our invention are:

1 to provide for recording a complete signal episode that is not restricted to either just a "preamble" segment or just a "postamble" segment as in the prior art. An episode recorded by our invention is comprised of both a "preamble", i.e. the signal segment received just prior to a record activation signal, and a "postamble", the signal segment received immediately following the user activating a record signal.

2 to provide controls over the rate at which the input signal is sampled:
   a) either by providing direct control to the user; or-
   b) providing an adaptive sampling rate that automatically varies the sampling according to the specific instantaneous signal content.

3 to provide the user the capability of varying the proportions of the preamble and postamble segments comprising a recorded episode.

4 to provide a multi-signal (i.e. multi-signal-channels) recording capability whereby a recorded episode is comprised of simultaneous samples from multiple input signals.

5 to provide an automatic sequencing of recording in which the recorder automatically begins recording the next episode after completion of the recording of the previous episode.

6 to provide a skip forward and skip backward, i.e. fast forward and reverse, capability for use in replaying an episode.

7 to provide a squelch capability in which quiescent signal intervals are not recorded.

8 to provide the capability of playing back a previously recorded episode while continuing to record a preamble of a live received signal.

DRAWING DESCRIPTION

List of Reference Numbers

Figure 1:
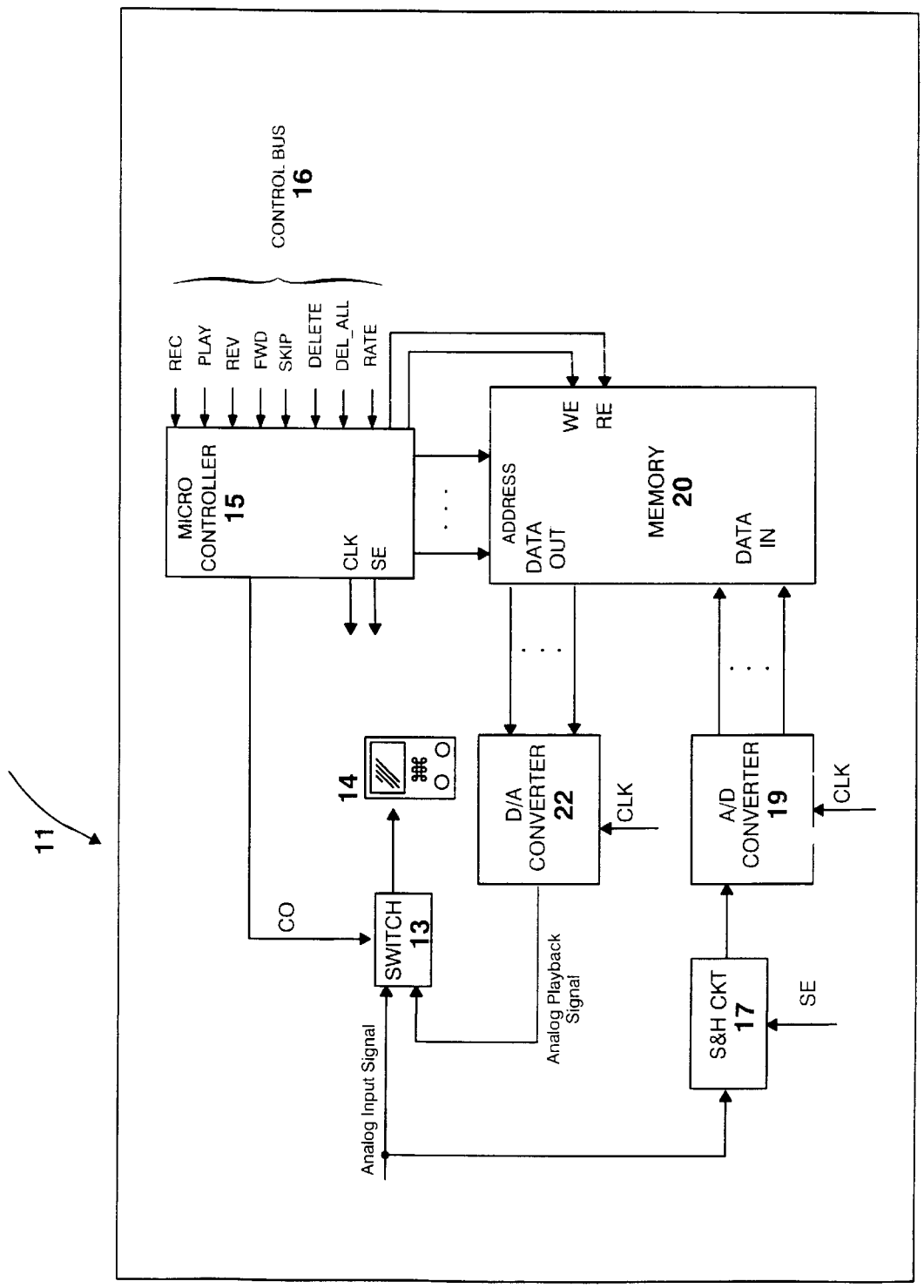
FIG. 1 is a block diagram of a single-signal hardware circuit.

11 Single-signal Signal Recorder (hereafter recorder 11)
12 Multi-signal Signal Recorder (hereafter recorder 12)
13 Switch
13' Switch, multi-signal
14 A/V Output Device
14' A/V Output Device (multi-signal)
15 Microcontroller
16 Control Bus (comprising input "control signals")
17 Sample and Hold Circuit
17' Sample and Hold Circuit (for multi-signals)
18 Analog Multiplexer for A/D Converter
19 Analog to Digital Converter
20 Memory (semiconductor, read-write RAM)
21 Digital Multiplexer for D/A Converter
22 Digital to Analog Converter
22' Digital to Analog Converters (for multi-signals)

SUMMARY

This is an A/V signal recorder with a "deferred recording" capability. It allows the user to record A/V signal episodes for later playback. It continually records an input A/V signal to allow the user to, in effect, "go back in time" and record a just transpired A/V signal segment and a segment of the following context-adding signal material.

The recorder of this invention has analog inputs and analog outputs. It continually outputs an analog A/V signal which is either the live input signal or else a playback of a previously recorded signal. The device continually samples the analog input signal in real time, digitizes it, and stores it as a potential preamble in a semiconductor memory. When a record switch is activated, the just recorded preamble is frozen and a brief additional signal segment, a postamble, is also recorded. In order to play back, the device periodically retrieves each sample at the original sampling rate and converts it back to an analog signal.

Depending on the specific embodiment, additional capabilities include: sampling rate control, skipping forward and backward during replay, skipping entire episodes, and deleting individual and/or all episodes. In one embodiment, quiescent intervals of an input signal are automatically squelched, i.e. are not recorded.

Recorder 'Embodiments', Hardware Circuits, and Software 'Implementations'

This section introduces the terms 'embodiments', 'circuits', and 'implementations' as used within this specification.

Multiple recorder embodiments are disclosed in this specification. Each recorder embodiment is defined by a specific combination of a hardware circuit and a software implementation. Our signal recorder is based on computer software implementations which control hardware circuits. The hardware circuit comprises either a single or a multi-signal channel recorder circuit. The software implementation comprises either a single or multi-episode implementation.

The following are examples of recorder embodiments disclosed here:
   a) single-signal circuit with single-episode recording
   b) single-signal circuit with multi-episode recording
   c) multi-signal circuit with single-episode recording
   d) multi-signal circuit with multi-episode recording The above examples are illustrative only and do not limit the embodiments disclosed in this specification.

Description of Hardware Circuit

Our recorder uses two versions of hardware which are briefly described here. A single-signal (channel) recorder circuit 11 is shown in FIG. 1 and a multi-signal recorder circuit 12 is shown in FIG. 2.

Figure 2:
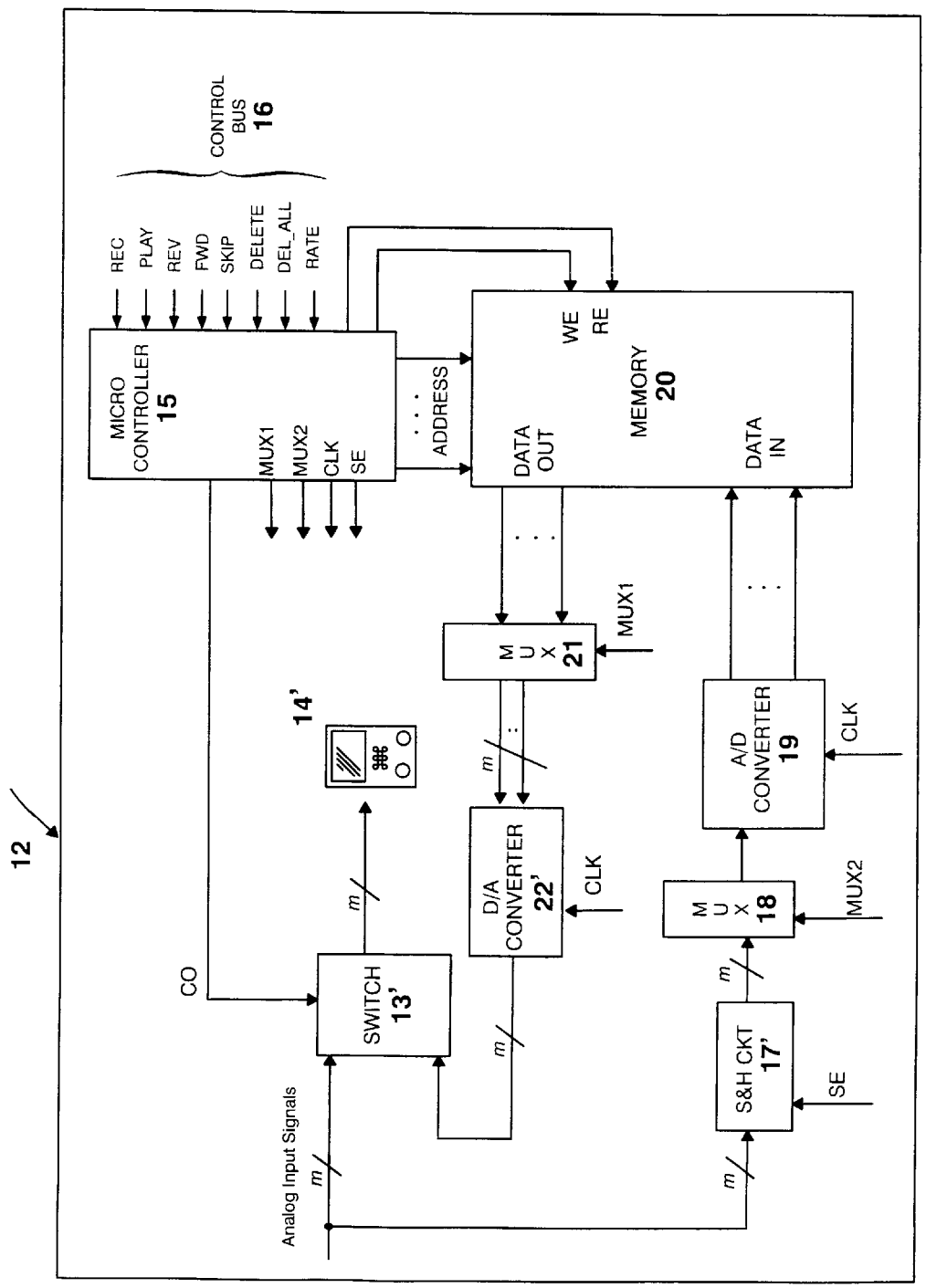
FIG. 2 is a block diagram of a multi-signal hardware circuit.

Referring to FIG. 1 and FIG. 2, each hardware circuit version contains a common microcontroller 15 which controls the recorder's operation. Microcontroller 15, in turn, is operated by a computer software program which resides in a read-only-memory, ROM, not illustrated, contained within microcontroller 15. The operation of the software program, in turn, is directed by user activated control signals which are input to microcontroller 15 via a control bus 16. The microcontroller 15 in turn controls the recorder hardware via the following control signals generated by microcontroller 15:

CO SE WE RE

MUX1 MUX2 CLK

In a variation (not shown) of the above computer architecture, the software program resides instead in an electrically erasable programmable ROM, i.e. a EEPROM, contained within microcontroller 15. In yet another variation (not shown) the software program resides instead in a volatile RAM memory 20. Memory 20 is also used to store the recorded signal episodes.

Operation of Hardware

In these discussions, the term "live signal" is used to distinguish the input and the playback signals. Here, the term "live signal" refers to any input A/V signal and is not necessarily restricted to a just received "off the air" A/V signal.

Additionally, the term "A/V signal" refers to a signal that may be either audio or video, or other electrical signals including representations of still or moving images.

Operation of Hardware for Single-Signal Recorder 11

As shown in FIG. 1, single-signal recorder 12 records and plays back single analog A/V signals. Recorder 11 according to our invention is situated between an analog input signal and an analog output signal connected to an A/V output device 14. Output device 14 is normally contained in a radio receiver, television receiver, telephone or other A/V device which can be a speaker or the like. Recorder 11 operates in either a record mode or a playback mode as will be explained below. A switch 13 is interposed between the input signal and the output signal. Switch 13 is controlled by microcontroller 15 via a signal CO. The analog input signal is also applied to a sample and hold circuit 17 which is actuated by sample enable signal SE.

An input control bus 16 is comprised of a group of signals that control the detailed operation of microcontroller 15. The individual signals are: REC, PLAY, REV, FWD, SKIP, DELETE, DEL_ALL, and RATE. These signals are described elsewhere in the applicable embodiments and variations.

During recording, the live input signal is simultaneously passed directly through switch 13 to A/V output device 14 and also applied to sample and hold circuit 17. The output of sample and hold circuit 17 is applied to an A/D converter 19 under control of a clock signal CLK and the digital output of A/D converter 19 is applied to the data input of memory 20.

A pair of control signals WE and RE are set as follows during recording: WE is enabled and RE is disabled.

During playback, the digital signal samples from memory 20 are applied to a D/A converter 22 under control of clock signal CLK. A playback analog signal of D/A converter 22 is applied to switch 13 and thereafter to A/V output device 14. The pair of control signals WE and RE are set as follows during playback: WE is disabled and RE is enabled. Additionally, for certain analog signal types, e.g. audio, a conventional smoothing circuit (not shown) may be interposed between D/A converter 22 and switch 13.

Additionally, to optimize memory 20 usage, data compression may be used. Accordingly, a conventional data compression circuit (not shown) may be interposed between A/D converter 19 and memory 20 and a conventional data decompression circuit (not shown) may be interposed between memory 20 and D/A converter 22.

Operation of Hardware for Multi-Signal Recorder 12

As shown in FIG. 2, multi-signal recorder 12 records and plays back multiple analog A/V signals. Recorder 12 according to our invention is situated between the Analog Input Signals and the Analog Output Signals connected to A/V output device 14'. Recorder 12 records and plays back multiple analog A/V signals.

The input control bus 16 from FIG. 1 is also used here in recorder 12 where, as before, the individual signals control the detailed operation of microcontroller 15.

During recording, recorder 12 directly outputs the m live input signals while recording those signals. The m input signals are also applied continuously to multiple signal sample and hold circuit 17' for simultaneous sampling under control of signal SE from microcontroller 15.

Then the analog samples are sequentially applied, via an analog multiplexer 18 under control of a signal MUX2, to A/D converter 19 for digitizing under control of signal CLK and subsequently applied to the data input of memory 20. The pair of control signals WE and RE are set as follows during recording: WE is enabled and RE is disabled.

During playback, recorder 12 outputs a previously recorded multi-signal episode. Microcontroller 15 sequentially applies the multi-signal digital samples from memory 20 to a digital multiplexer 21. The digital outputs of multiplexer 21 are then applied to multi-signal D/A converter 22' whose m analog outputs are connected through switch 13' to multi-signal output device 14'.

Digital multiplexor 21 is operated by a control signal MUX1 from microcontroller 15 in order to output the m multiple analog signals synchronously. When the digital value for every individual signal sample has been loaded into multi-signal D/A converter 22', microcontroller 15 supplies the control signal CLK which initiates the synchronous conversion of the recorded signals back to an analog signal format. The pair of control signals WE and RE are set as follows during playback: WE is disabled and RE is enabled.

The multi-signal circuit of FIG. 2, in which the individual input signals are sampled simultaneously, is preferred for applications in which it is useful that the individual playback signals be closely time synchronized, e.g. stereo audio.

General Considerations for Sampling, Digitizing, and Storing A/V Signals

The specific sampling rate used and the physical size of an episode storage buffer in memory 20 are based on the following considerations. Values for these parameters may be chosen to achieve a balance between fidelity and efficient use of memory 20.

Audio

For recording audio signals of voice content, a sampling rate of 10 KHz is typically adequate and a recorded episode duration of about 15 seconds is preferable. Accordingly, an episode buffer size of 150 kilobytes in size is required. Furthermore, a sampling rate of as low as 5 KHz could also be used while still retaining voice quality fidelity.

In contrast, a higher sampling rate and longer episode length are preferred for recording audio music signals. For music, a sampling rate of 20 KHz and a recorded episode duration of approximately 30 seconds is preferred. Accordingly, an episode buffer size of 600 kilobytes in size is required. Furthermore, for high fidelity applications, a 44 KHz sampling rate, as used in CD audio, is preferred.

Video

When used with conventional video, the bit rates will be 10 MBits/sec. Accordingly, with a compression ratio of 10:1, implementation of recorder 11 can be based on the semiconductor memory 20 containing, for example, four 16 MBit chips so as to produce four recorded video signal episodes of 15 seconds each.

DESCRIPTION & OPERATION OF EMBODIMENTS

Two major embodiments are disclosed: a First Embodiment for recording a single episode and an Alternate Embodiment for recording multiple episodes. Variations of these two major embodiments are also disclosed below. The implementation details of a computer program to implement the state machines described below will be obvious to those skilled in the art.

While each embodiment and its variations is described in isolation and those descriptions contains many specificities, these should not be construed as limitations on the scope of our recorder. Many other variations are possible including other combinations of the embodiments described below.

Description & Operation: First Embodiment

A first embodiment is a single-signal (channel) recorder which records a single-episode. This embodiment is one state machine that could be implemented using the single-signal hardware circuit of FIG. 1 and is modeled as a state machine in the software implementation of FIG. 3.

The main embodiment has the following characteristics:

Modes: Record, Playback, and Idle

Input Control Signals: a pair of control signals REC and PLAY

Episode Format: The recorded episode is of fixed time length and contains preamble and postamble segments of fixed lengths. The preamble segment contains the signal received just preceding activation of signal REC. The postamble segment contains the A/V signal received immediately following activation of signal REC.

Number of Episodes: A single-episode is recorded in an episode buffer in memory 20.

Still referring to FIG. 3, following the beginning of operation, i.e. a START state, this embodiment enters a state 302 and subsequently moves between the remaining states according to the application of external control signals REC and PLAY. The individual states and transition paths of this embodiment are described below.

Preamble Recording

The recorder 11 continuously records a predetermined length preamble in real time in state 302. Specifically, for a preamble length of t seconds, the recorder continuously stores the most recent t seconds of input signal and overwrites the previously recorded oldest signal material. When signal REC is momentarily activated, preamble recording ceases and a postamble recording state 306 is entered.

Postamble Recording

A fixed length postamble is recorded in state 306. When postamble recording is done, an Idle state 308 is automatically entered.

Idle

In this state 308, recorder 11 is ready to either playback the recorded episode or begin recording a new episode. Another momentary activation of signal REC causes preamble recording state 302 to be re-entered where the previously recorded episode will be overwritten. Momentary activation of signal PLAY causes a play back state 310 to be entered.

Playback

The recorded episode is played back once in this state 310. When playback is done, the Idle state 308 is re-entered.

Figure 3:
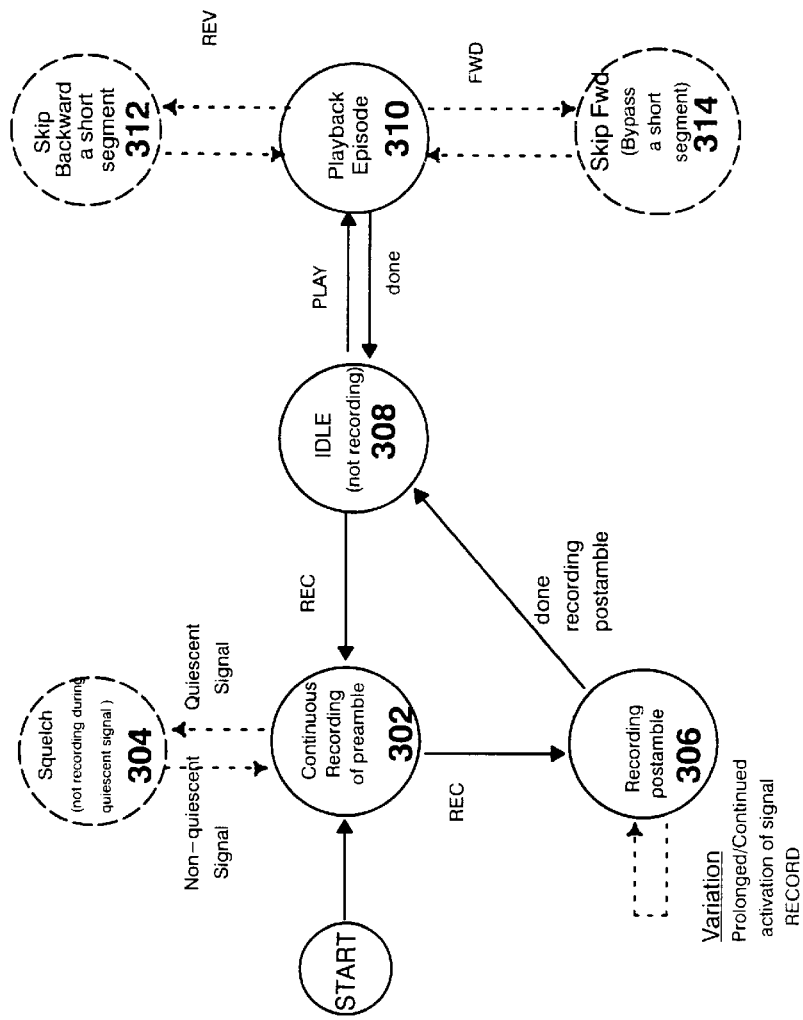
FIG. 3 is a state diagram defining the operation of a single-episode software implementation of our recorder.

Note that the state machine of FIG. 3 could also be implemented with the multi-signal recorder 12 hardware of FIG. 2 for multi-signal applications.

First Variation: Variable Proportioned Preamble & Postamble

A first variation of this embodiment is illustrated in FIG. 3. Here also a fixed time length episode is recorded. However, the episode preamble and postamble segment lengths are proportioned variably according to user control.

This variation operates as follows. As before, in preamble recording state 302, a preamble is continually recorded in the episode buffer of memory 20. After a brief initial interval, the (fixed length) episode buffer has been filled with the continuously recorded preamble. As time progresses, the episode buffer is overwritten repeatedly with newer preamble signal material. Eventually, the user activates the signal REC which terminates the continuous preamble recording in state 302. Then postamble recording state 306 is entered where a variable length postamble segment is recorded over part or all of the previously recorded preamble segment.

As long as signal REC continues to be active, postamble segment recording continues and may eventually overwrite the entire just recorded preamble segment. In other words, to record a relatively long postamble, the operator activates the signal REC in preamble recording state 302 and continues to activate it until a postamble of adequate length has been recorded. Therefore, the final proportions of the preamble and postamble segments depend on how long signal REC is active. Brief activation of signal REC results in a relatively long preamble segment and a short postamble segment. Conversely, a prolonged activation of signal REC results in a relatively short preamble segment and a long postamble segment. In extreme cases, either a zero length preamble or a zero length postamble may result from an extremely long or an extremely short activation respectively of signal REC.

Second Variation: User Controlled Sampling Rate

A second variation of this embodiment, preferably for audio applications, is also illustrated in FIG. 3 where it is modeled as a state machine. A signal RATE, part of control bus 16, determines the rate at which the input signal will be sampled. That rate will affect both the fidelity and the total time length of a recorded episode. The state of signal RATE determines which sampling rate will be used from a predetermined pair of rates. This variation is another software state machine that could be implemented with the circuits of either single signal recorder 11 or multi-signal recorder 12.

Third Variation: Skip Forward & Reverse

A third variation of this embodiment is illustrated in FIG. 3. It mimics Video Cassette Recorder operations of fast forwarding and rewinding according to the states of a pair of control signals FWD and REV, which are part of control bus 16. These functions are performed during the Playback Episode state 310. For each activation of signal FWD in playback state 310, a Skip Forward state 314 is entered. In state 314, a short segment of the recorded episode being played back (preferably about 2 seconds) is skipped much like a VCR fast forward operation. Similarly, each activation of the signal REV in playback state 310 causes the recorder 11 to enter Skip Backward state 312 to back up by a short segment (preferably about 2 seconds) within the recorded episode being played back and then replay starting from that earlier point within the recorded signal episode.

In an additional variation (not shown), recorder 11 outputs either an accelerated playback signal or an accelerated reverse-playback. While signal FWD is continuously activated, the output is an accelerated playback. Likewise, while signal REV is continuously activated, the output is an accelerated reverse-playback. A playback rate of about 5–10 times the normal playback rate is preferred.

Fourth Variation: Squelch of Recording

A fourth variation of this embodiment, preferably for audio applications, is illustrated in FIG. 3. This variation provides a recording squelch capability wherein intervals of no signal, i.e. quiescent signal intervals, are not recorded and the use of memory 20 is optimized. This feature is implemented in software such that the input signal amplitude determines whether the input signal is recorded.

In this variation, recorder 11 does not record quiescent intervals of the input signal, i.e. input signals whose amplitude is below a predetermined threshold. As shown in FIG. 3, whenever a quiescent input signal is detected in state 302, recording is temporarily suspended. At that time, a squelch state 304 is entered until the input signal level again rises above a predetermined threshold level. This feature optimizes the use of the typically size limited memory 20 by not wasting memory space by recording quiescent signal intervals.

In an additional variation (not shown), postamble recording in state 306 is also squelched for quiescent signal intervals.

In yet another variation (not shown), the squelch threshold level is determined dynamically from a moving average of the input signal voltage level. An input signal voltage of about 10 db below the average is preferred as a squelch threshold.

Fifth Variation Adaptive Sampling Rate

A fifth variation of this embodiment, preferably for audio applications, provides a means for "adaptive sampling rate selection". The purpose of the sampling rate selection is to optimize the use of available memory 20. While continuously recording the input signal, a software signal discrimination algorithm continuously analyzes the input signal, and automatically selects the most appropriate sampling rate based on the "frequency of zero crossings".

Referring to FIG. 3, in states 302 and 306, recorder 11 automatically adapts its sampling rate to the average frequency of the live input signal. Accordingly, an episode recorded in memory 20 is comprised of multiple records in which each record typically contains approximately one second of recorded data. The individual sampling rate for the data in a block is recorded in that block.

In a preferred variation, the automatically selected sampling rate is chosen from a set of predetermined rates. In another variation, a sampling rate is algorithmically calculated such that any rate from a predetermined range may be used.

Sixth Variation Multi-Channel Recorder

A sixth variation of this embodiment, a multi-signal recorder 12, provides a multi-signal recording capability using the hardware circuit of FIG. 2. This provides a means for simultaneously, i.e. synchronously, sampling and storing signals from m signal channels in order to record a multi-signal episode. Also, a means for playing back those multi-signal episodes is provided. A preferred application is for stereo audio.

At each sampling time, recorder 12 simultaneously samples each of the m individual analog input signals. Such simultaneous sampling is necessary for applications in which the playback of the individual signals must be synchronized. Again, a preferred application is for stereo audio.

In another multi-signal variation (not explicitly shown), the m individual signals are deliberately sampled at disparate sampling rates. This feature optimizes the use of memory 20 by using a lower sampling rate for individual channels when appropriate. Such use of disparate sampling rates necessarily comprises asynchronous sampling of individual signal channels. The specific individual sampling rates may either be predetermined or may be adaptively determined as described above in "Adaptive Sampling Rate".

Description & Operation-Alternate Embodiment

An alternate embodiment is a multi-episode recorder. This embodiment is another state machine that could be implemented using the single-signal hardware circuit of FIG. 1 and is modeled as a state machine in the software implementation of FIG. 4. The alternate embodiment has the following characteristics:

Modes: Record and Playback

Episode Format: The recorded episodes are of fixed total time length and contain both preamble and postamble segments of fixed proportions.

Number of Episodes: Multiple-episodes are recorded in memory 20. Although n physical episode buffers are used for storage, only n-1 episodes are available for playback at any time since one of the n episode buffers, Ep[r], is continuously recorded into by recorder 11.

Input Control Signals: REC and PLAY

Episode Buffer Management: At a given time in the operation of recorder 11, some of the n physical buffers may contain valid recorded episodes and some may not. Consequently a buffer management function is implemented in software to facilitate identifying the state of an individual buffer. The state of an individual buffer is defined by the corresponding validity bit in an Episode Bit Map located in memory 20. Each bit in the map corresponds to a physical episode buffer. The coding of the bits is defined as follows:
"0" indicates the associated buffer does not contain a valid recorded episode;
"1" indicates the associated buffer does contain a valid recorded episode.

Still referring to FIG. 4, following the beginning of operation, i.e. a Start, this embodiment enters an initialization state 320 and subsequently transitions between the remaining states according to the application of external control signals REC and PLAY. The individual states of this embodiment and transition paths of this embodiment are described below.

Figure 4:
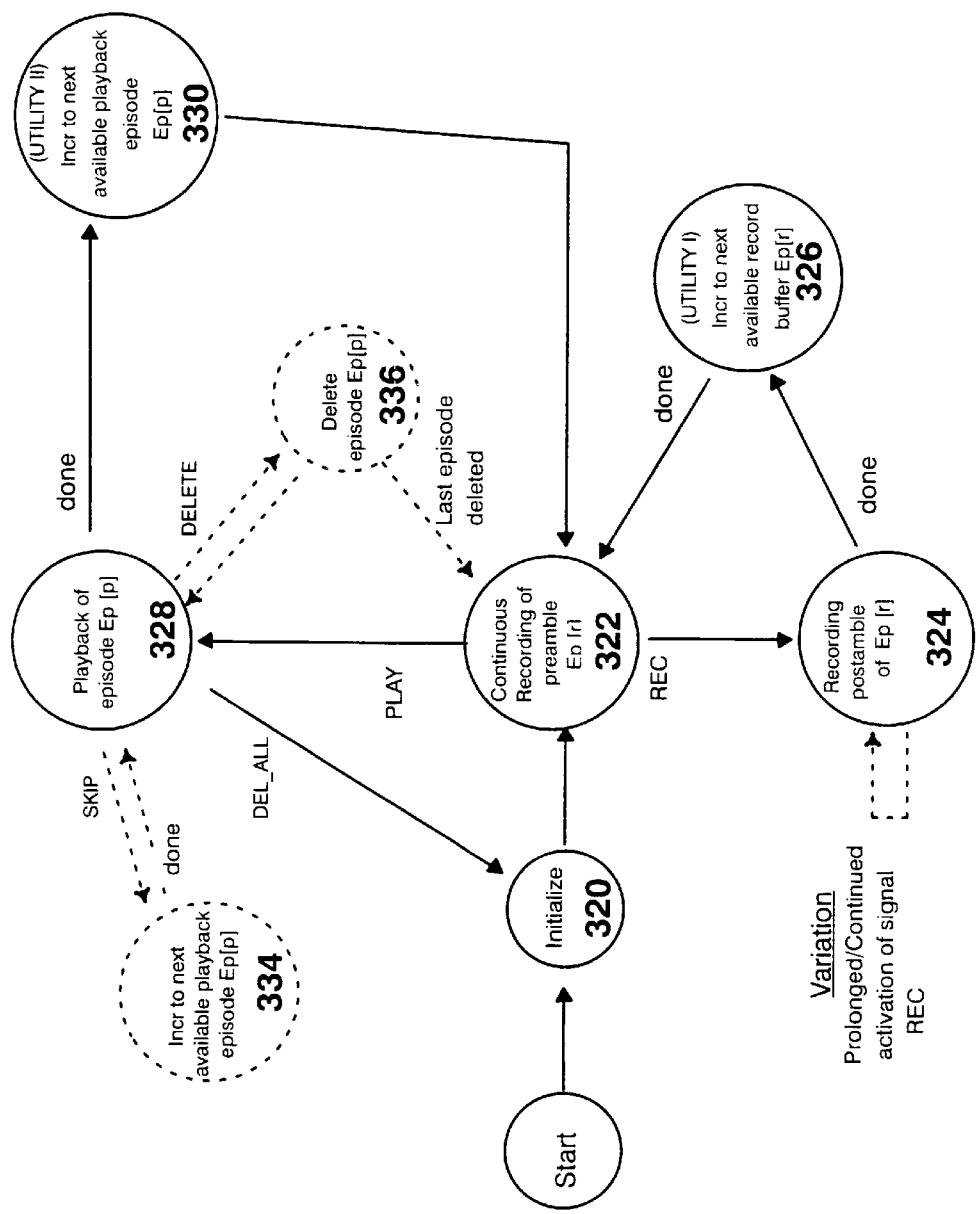
FIG. 4 is a state diagram defining the operation of a multi-episode software implementation of our recorder.

As illustrated in FIG. 4, indices "r" and "p" are associated with record and playback buffers respectively. Accordingly, record index "r" designates the episode buffer Ep[r] in memory 20 that will be recorded and playback index "p" designates the episode Ep[p] that will be played back.

This embodiment has an "auto sequencing" feature. Following the completion of recording an episode Ep[r], recorder 11 automatically sequences to the next available physical episode buffer Ep[r'] and begins recording there without pause.

Initialization
In an initialization state 320, indices "r" and "p" are initialized to "1" and the Episode Bit Map is reset to denote that no previously recorded episodes exist yet. Note that immediately following initialization, Ep[p], i.e. Ep[1], is not yet a valid episode.

Preamble Recording
The recorder 11 continuously records a preamble in real time for episode Ep[r] in a preamble recording state 322. When signal REC is activated, preamble recording ceases and postamble recording state 324 is entered. Similarly, activation of external signal PLAY in state 322 causes a playback state 328 to be entered, provided Ep[p] is actually valid, i.e. that the buffer contains a valid previously recorded episode. To this end, the Episode Bit Map settings are used to identify whether buffer Ep[p] contains a valid episode.

Postamble Recording
The recorder 11 records a fixed length postamble in state 324. When postamble recording is done, a Utility I state 326 is entered.

Utility-I
In this Utility-I state 326, the Episode Bit Map is updated to reflect that the just recorded Ep[r] is a now valid episode. Then, index "r" is incremented to the next physical buffer available for recording.
Recording index "r" has the following range:
1≤r≤n where n is the total number of physical episode buffers allocated in memory 20.
The preamble recording state 322 is automatically re-entered from here.

Playback
In this Playback state 328, recorder 11 plays back an episode Ep[p] and when playback is done, a Utility II state 330 is entered.

Utility-II
Index "p" is incremented in this Utility II state 330 to the next available valid recorded episode Ep[p'], if any, according to the Episode Bit Map. Playback index "p" has the same range as "r" above.
Preamble recording state 322 is re-entered from here where continuous recording of the preamble of episode Ep[r] begins anew.

Note that this multi-episode embodiment state machine of FIG. 4 could also be implemented with the multi-signal recorder 12 hardware of FIG. 2 for multi-signal applications.

First Variation: Deletion of Episode

A first variation of this multi-episode embodiment provides the capability of deleting the current playback episode Ep[p]. Referring to FIG. 4, a Delete Episode state 336 is added.

To illustrate, if a signal DELETE is activated in play back state 328, recorder 11 briefly enters state 336 and deletes episode Ep[p] by resetting the corresponding bit 'p' in the Episode Bit Map to the invalid state. Additionally, index "p" is updated to indicate the next available previously recorded episode, Ep[p'], if any. Episode playback state 328 is then re-entered and playback of the newly selected episode Ep[p'] begins. In the case that the deleted episode Ep[p] was the only episode, preamble recording state 322 is instead re-entered where recording begins anew.

It will be obvious that other variations of the logic described above are possible and the operation described herein is illustrative only.

Second Variation: Delete All Episodes

A second variation of this multi-episode embodiment is illustrated in FIG. 4. An external control signal DEL_ALL provides a means for deleting, i.e. erasing, all recorded episodes Ep[1] through Ep[n], where n is the maximum number of recorded episodes.

To illustrate, if signal DEL_ALL is activated in playback state 328, initialization state 320 is re-entered where the Episode Bit Map is reset to delete all previously recorded episodes.

In another variation (not shown) activation of signal DEL_ALL in any state will also have the effect of deleting all previously recorded episodes.

Third Variation: Simultaneous Record & Playback

A third variation (not explicitly shown) of this multi-episode embodiment provides the additional capability of continuing preamble recording while playing back a previously recorded episode. This variation is another software state machine that could be implemented by the circuit of FIG. 1. Referring to FIG. 4, state 328 in this case instead consists of two simultaneous operations:
1) Playback of episode Ep[p]
2) Continued recording of episode Ep[r] that began in state 322

It goes without saying that when using a single microcontroller, the playback and recording are actually not performed concurrently but are instead performed via multitasking.

Another variation (not explicitly shown) is also a dual output signal (channel) application. As before, the recorder 11 records one input signal and simultaneously plays back another previously recorded signal. However, both signals are simultaneously output on separate channels. A preferred application for this variation is audio. This variation insures that a potentially important live input signal received during playback is not lost. While the live input signal is output on one channel, the playback signal is output on the second channel. Accordingly, switch 13 in this case passes the live input signal directly through and also outputs the playback signal. Still referring to FIG. 4, playback state 328 in this case has two exit paths. As before, when playback is done, Utility-II state 330 is entered. Additionally, if RECORD is activated in playback state 328, playback is terminated and preamble recording state 322 is re-entered. This variation may also be implemented with the multi-signal circuit of FIG. 2.

Fourth Variation: Skip Episode During Playback

A third variation of this multi-episode embodiment provides the capability of skipping to the next available previously recorded episode Ep[p'] for playback. Referring to FIG. 4, a Skip to next Episode state 334 is added.

To illustrate, if a signal SKIP is activated in playback state 328, the playback of Ep[p] stops and the playback of the next available episode Ep[p'], if any, begins. Specifically, following activation of SKIP in state 328, state 334 is briefly entered where the next available previously recorded episode Ep[p'] is selected according to the Episode Bit Map. Playback state 328 is then re-entered and playback of the newly selected episode Ep[p'] begins. If a second previously recorded episode does not exist, index p is not changed in state 334.

Fifth Variation: Recording of Variable Length Episodes

A fifth variation of this multi-episode embodiment, illustrated in FIG. 4, provides the capability of recording variable length episodes. The overall length of the recorded episode will be proportional to how long signal REC is continually activated by the user. However, the predetermined length of the preamble segment is not affected by the duration of signal REC activation.

In other words, to record a relatively long episode, the operator first activates the signal REC in preamble recording state 322. Then, after postamble state 324 has been entered, the operator continues to activate it until a postamble of adequate length has been recorded.

Thus, brief activation of signal REC results in an episode with a relatively short postamble segment and a prolonged activation results in an episode with a relatively long postamble segment.

This variation necessarily uses a variation of the Episode Management functionality used in the above multi-episode variations. The Episode Bit Map, used in other variations above, is still used. Additionally, an Episode Index is stored in memory 20, and is used to record the starting address and the length of each recorded episode. A counter, also stored in memory 20, is associated with this Episode Index and indicates the number of entries in the Episode Index list.

Conclusions, Ramifications, and Scope of Invention

Thus, the reader will see that the disclosed signal recorder of the invention provides a comprehensive solution to the need for deferred recording of A/V signal episodes for subsequent playback. Furthermore, since a general purpose microcontroller is used as a control mechanism, evolutionary related devices may be rapidly, inexpensively, and easily implemented by simply modifications to the control program software of our recorder.

In addition, external control signals, e.g. signal REC, which are input on control bus 16, can be instead "local switches" configured as part of our recorder.

While the above description contains many specifics, these should not be construed as limitations on the scope of our recorder, but rather as exemplifications of preferred embodiments thereof. Many other variations are possible, including other combinations of single and multi-signal recorders and single and multiple episode software implementations.

Accordingly, the scope of the invention should be determined not by the embodiments illustrated, but instead by the appended claims and their legal equivalents.

What is claimed is:

1. An audio/visual signal recorder for recording an episode of a first audio/visual sign, wherein said episode comprises a preamble time segment and a postamble time segment, said recorder comprising:

means for recording the preamble time segment of said audio/visual signal episode;

means for recording the postamble time segment of said audio/visual sign episode, wherein said postamble recording means is actuated by a user input, wherein the postamble time segment comprises a portion of said audio/visual signal episode occurring after the user input actuation; and audio/visual signal episode playback means comprising means for playing back said recorded preamble time segment followed by said recorded postamble time segment.

2. The recorder of claim 1, wherein said means for recording a preamble time segment and said means for recording a postamble time segment comprise a digital data storage means for storing the recorded segments.

3. The recorder of claim 1, wherein the means for recording a preamble time segment, the means for recording a postamble time segment, and the means for playing back comprise a microcontroller.

4. The recorder of claim 1, wherein said means for recording a postamble time segment comprises means for selecting the length of the postamble time segment.

5. The recorder of claim 1, further comprising means for determining a recording sampling rate according to an input control signal.

6. The recorder of claim 1, further comprising means for determining a recording sampling rate based on said first audio/visual signal.

7. The recorder of claim 1, wherein said playback means further comprises means for bypassing a short section of the signal episode according to a first input control signal; and means for returning to a previously played point in the signal episode in response to a second input control signal.

8. The recorder of claim 1, further comprising means for squelching recording, whereby quiescent signal intervals of said first audio/visual signal are not recorded.

9. The recorder of claim 1, further comprising:

means for recording an episode of at least one additional audio/visual signal, wherein said means for recording an episode of at least one additional audio/visual signal comprises:

means for recording the preamble time segment of said audio/visual signal episode of at least one additional audio/visual signal; and means for recording the postamble time segment of said audio/visual signal episode of at least one additional audio/visual signal.

10. The recorder of claim 9, further comprising means for selecting a sampling rate for said first audio/visual signal and means for selecting samples rates for respective ones of each said at least one additional audio/visual signal.

11. The recorder of claim 9, further comprising means for selecting one of synchronous or asynchronous sampling of said first audio/visual signal and said at least one additional audio/visual signal.

12. An audio/visual signal recorder for recording multiple episodes of an audio/visual signal, wherein each said episode comprises a preamble time segment and a postamble time segment, said recorder comprising:

means for recording multiple episodes of an audio/visual signal, said means for recording comprising meams for recording preamble time segments of audio/visual signal episodes and means for recording postamble time segments of audio/visual signal episodes, wherein each of said postamble time segments comprise a portion of the respective audio/visual signal episodes occurring after a user input actuation; and mean for playing back an individual episode of said recorded multiple audio/visual signal episodes.

13. The recorder of claim 12, further comprising:

a memory comprising multiple signal episode buffers;

automatic recording sequencing means for automatically sequencing to the next available signal episode buffer in said memory after operation of said multiple episode recording means, wherein said multiple episode recording means records the next signal episode of said audio/visual signal into said next available signal episode buffer; and automatic playback sequencing means for automatically sequencing to the next used signal episode buffer is said memory, wherein said means for playing back plays back the signal episode recorded in said used signal episode buffer.

14. The recorder of claim 10, further comprising:

deletion means for erasing the signal recorded in one of said multiple signal episode buffers, whereby said one of said signal episode buffers is made available for said automatic recording sequencing means.

15. The recorder of claim 10, further comprising:

deletion means for erasing the signals recorded in all of said multiple signal episode buffers, whereby all of said signal episode buffers are made available for said automatic recording sequencing means.

16. The recorder of claim 10, wherein said automatic playback sequencing means comprises means for skipping a used signal episode buffer.

17. The recorder of claim 12, further comprising:

means for selecting the length of the preamble time segment of signal episodes; and means for selecting the length of the postamble time segment of signal episodes.

18. The recorder of claim 12, further comprising:

control means for controlling the operation of said recording means simultaneously with the operation of said playback means, whereby said control means provides for simultaneously recording a signal episode while playing back a previously recorded signal episode.

19. A method for recording and playing back an audio/visual signal episode of at least one audio/visual signal, the signal episode comprising a preamble time segment and a postamble time segment, the method comprising the steps of:

a) receiving said at least one audio/visual signal;

b) continuously recording said preamble time segment of said audio/visual signal episode of said at least one audio/visual signal until activation of a record signal;

c) thereafter recording said postamble time segment of said audio/visual signal episode of said at least one audio/visual signal by recording a portion of said audio/visual signal occurring after said activation of a record signal; and d) playing back said audio/visual signal episode recorded in steps (b) and (c).

20. The method according to claim 19, wherein:

step (b) comprises recording said preamble time segment of said audio/visual signal episode in a memory;

step (c) comprises recording said postamble time segment of said audio/visual signal episode in said memory; and step (d) comprises playing back said audio/visual signal episode recorded in said memory.

* * * * *